(12) United States Patent
Yoo (10) Patent No.: US 11,287,724 B2
(45) Date of Patent: Mar. 29, 2022

(54) AUTOMATIC ILLUMINATION CONTROL APPARATUS FOR ADJUSTING OUTPUT OF ILLUMINATION DEVICE DEPENDING UPON DISTANCE BETWEEN SUBJECT AND ILLUMINATION DEVICE

(71) Applicant: HYUNDAI FOMEX CO., LTD., Seoul (KR)

(72) Inventor: Jae Kyun Yoo, Seoul (KR)

(73) Assignee: HYUNDAI FOMEX CO., LTD., Seoul (KR)

( * ) Notice: Subject to any disclaimer, the term of this patent is extended or adjusted under 35 U.S.C. 154(b) by 0 days.

(21) Appl. No.: 16/475,159

(22) PCT Filed: Oct. 19, 2017

(86) PCT No.: PCT/KR2017/011564
§ 371 (c)(1),
(2) Date: Jul. 1, 2019

(87) PCT Pub. No.: WO2018/124439
PCT Pub. Date: Jul. 5, 2018

(65) Prior Publication Data
US 2019/0335566 A1 Oct. 31, 2019

(30) Foreign Application Priority Data
Dec. 30, 2016 (KR) .................. 10-2016-0183448

(51) Int. Cl.
*G03B 15/05* (2021.01)
*H05B 47/11* (2020.01)
(Continued)

(52) U.S. Cl.
CPC .............. *G03B 7/17* (2015.01); *G03B 15/05* (2013.01); *H05B 47/11* (2020.01); *H05B 47/115* (2020.01); *H05B 47/19* (2020.01)

(58) Field of Classification Search
CPC .... G03B 15/00; G03B 15/05; G03B 2215/05; G03B 7/02; G03B 7/16; H04N 5/2256;
(Continued)

(56) References Cited

U.S. PATENT DOCUMENTS

| 2005/0265014 | A1* | 12/2005 | Matsui | G03B 15/05 362/5 |
| 2012/0280624 | A1* | 11/2012 | Baaijens | A47F 11/10 315/149 |
| 2016/0342071 | A1* | 11/2016 | Zhu | H05B 33/0854 |

FOREIGN PATENT DOCUMENTS

| JP | 2003233101 | | 8/2003 |
| JP | 2003233101 | A * | 8/2003 |

(Continued)

*Primary Examiner* — Thai Pham
(74) *Attorney, Agent, or Firm* — IPLA P.A.

(57) ABSTRACT

An automatic illumination control apparatus for adjusting an output of an illumination device depending upon a distance between a subject and the illumination device, includes: a distance measuring sensor installed at a position close to the illumination device to measure distance information between the illumination device and the subject; and an illumination managing unit configured to generate a management signal including an illumination intensity of illumination which is outputted from the illumination device according to the distance information, and send the management signal to the illumination device. With the present invention, even though the subject comes toward or away from the main illumination device and thus the distance between the subject and the illumination is changed, the illumination intensity indicative of the subject and the space around the subject and the color temperature can be constantly maintained, thereby obtaining the still picture or the motion picture with constant quality.

5 Claims, 3 Drawing Sheets

(51) Int. Cl.
*H05B 47/125* (2020.01)
*G03B 7/17* (2021.01)
*H05B 47/19* (2020.01)
*H05B 47/115* (2020.01)

(58) Field of Classification Search
CPC ........ H04N 5/232; H04N 5/225; H05B 37/02; H05B 37/0227; H05B 37/027; H05B 47/10; H05B 47/11; H05B 47/115; H05B 47/19; H05B 47/125
See application file for complete search history.

(56) References Cited

FOREIGN PATENT DOCUMENTS

| | | |
|---|---|---|
| JP | 2006259407 | 9/2006 |
| KR | 1020090076394 | 7/2009 |
| KR | 1020140094123 | 7/2014 |
| KR | 1020150072851 | 6/2015 |

* cited by examiner

AUTOMATIC ILLUMINATION CONTROL APPARATUS FOR ADJUSTING OUTPUT OF ILLUMINATION DEVICE DEPENDING UPON DISTANCE BETWEEN SUBJECT AND ILLUMINATION DEVICE

BACKGROUND

The present invention relates to an automatic illumination control apparatus for adjusting an output of an illumination device depending upon a distance between a subject and the illumination device, and more particularly, to an automatic illumination control apparatus for adjusting an output of an illumination device that can automatically adjust an illumination intensity or the like of the illumination device to constantly maintain an illumination environment wanted by a user, even though a distance between a subject and the illumination device is not constantly maintained, but is changed.

In general, the critical factor in taking still pictures (still photographic images) or motion pictures is light. A photograph which is known as luminal art is an image created by light, and a photographer can effectively represent a subject by variously utilizing light changes according to his or her intentions. That is, the same subject can be represented in various modes according to brightness, incident angle, and color temperature of light. In particular, the brightness of the light has the most important effect on the photography.

An amount of light entering a photography device which is the most important factor in taking still pictures or motion pictures is adjusted by an aperture and a shutter speed. In case where the adjustment by the aperture and the shutter speed is not sufficient, in particular, in case of a dark situation where the light is insufficient, the situation is overcome by adjusting an ISO value to control sensitivity of a CCD to the light. However, there is a problem in that if the ISO value is high, a noise is generated to deteriorate its quality, and thus the adjustment is used as a secondary adjusting method.

Specifically, a big aperture value (f-number) and a fast shutter speed can be used under situations of sufficient light. If the big aperture value is used (i.e., in case of small opened aperture), deeper depth of field can be obtained, so that it can take a sharp picture of the surroundings of the subject, as well as subject itself. In addition, in case of the sufficient amounts of light, the sufficient amounts of light can be received even by the fast shutter speed. If the shutter speed is increased, even the subject which is quickly moving or is moving in large numbers can be photographed.

Meanwhile, in case of sufficient amounts of light, a photographer of motion pictures can set a camera as a high quality before photographing.

Accordingly, most of photographers taking still pictures or motion pictures prefer the illumination circumstance in which the big aperture value and the quick shutter speed are used. However, sunlight is severely changed in a natural state, depending upon weather, time and surrounding environment. Also, common indoor living illumination is generally not sufficient to represent the subject according to intention of a photographer.

In order to solve the above problem, various illumination devices for still pictures or motion pictures have been proposed and utilized. That is, illumination devices are widely used at locations with insufficient light or in the photography field of still pictures or motion pictures to create different atmospheres.

For example, the illumination device generally used in the open air or in a studio to take still pictures or motion pictures includes a fluorescent lamp, a halogen lamp, a discharge lamp or a metal halide lamp as a light source.

Such an illumination device generally includes a support and a circular or rectangular housing installed on the support, and the housing is provided with one or more lamps. A condensing plate may be installed to a front end of the housing to collect and irradiate the light of the lamps in an opened direction. The illumination device of the above type is widely used as an illumination means for taking the still pictures or motion pictures.

The lamp commonly used for the general illumination device is a high-power consumption product of 200 W or 2 kW, and its lifespan is about 3000 to 9000 hours. In addition, the results are created in significantly different types during broadcasting or photographing according to the state of the lamps.

Accordingly, even though the lamp used for the illumination device has an extended useful life, since the color temperature can be changed after some period of time, a lifecycle of the lamp should be shorter than a standard duration of use in some cases. Therefore, expenses for lamp replacement will be increased.

In case of the illumination device using the halogen lamp, since strong radiant heat is generated together with light during use, a skin of a subject may be damaged during broadcasting or photographing, or the illumination device may malfunction or be broken due to high heat.

Since the halogen lamp has a drawback of being provided with a separate air-conditioning equipment to prevent the above problem, an illumination device using three-wave length lamps with high power efficiency and low heat generation has been proposed.

However, the illumination device for broadcasting and photographing requires total luminous flux of 20000 lumens or more, but there is a problem in that the three-wave length lamp does not meet the total luminous flux.

In order to solve the above problem of the conventional illumination device, an illumination device using high-efficiency LEDs has been proposed. The illumination device using the LEDs is very effective and economical, since energy consumption is decreased by half, and a lifespan is extended by 10 times, as compared to the conventional illumination device.

The illumination device using the LEDs generally includes a support and a rigid and flat, circular or rectangular housing installed on the support, and the housing is provided with a printed circuit board. A plurality of LED modules are installed on an upper portion of the printed circuit board, and a transparent panel is installed to a front end of the housing so that the printed circuit board and the LED modules are not exposed to the outside.

In case of utilizing the above photographing illuminations, an illuminometer is used to measure the brightness of a light source before photographing, or the brightness of the light source is checked through test photographing, in order to determine a proper aperture value, a proper shutter speed and an ISO value. There is a problem of delaying a photographing time due to the measurement of the brightness of the light source before photographing or due to the test photographing. In addition, in case where the brightness of the subject is changed due to the change of the illumination around the space in which the subject is positioned, and variation in amounts of sunshine, a step of measuring the illumination intensity or the test photographing step should be newly carried out at the moment of photographing. This is very cumbersome, and causes the photographing efficiency to significantly decrease.

In order to solve the above problems, a technology for automatically turning on or off the illumination device depending upon the surrounding brightness (illumination intensity) has been proposed. If the brightness is higher than a reference value, the illumination device is turned off (i.e., the illumination device does not work), but the brightness is lower than a reference value, the illumination device is turned on (i.e., the illumination device works). Therefore, the technology is just to turn on or off the illumination device depending upon the surrounding brightness.

In addition to the technology of just turning on or off the illumination device depending upon the surrounding brightness (illumination intensity), a technology of controlling the brightness of the illumination device according to the surrounding brightness (illumination intensity) has been proposed. Since the brightness of the illumination device is controlled only by illumination intensity value measured from the outside according to the illumination intensity of the surroundings, it is still difficult to obtain a sharper image at the step of taking a picture of the subject.

Specifically, the illumination intensity of the surroundings is not accurately reflected when the brightness of the illumination device is controlled. In particular, in case where the distance between the subject and the illumination is frequently changed, due to movement of the subject and the illumination, on photographing, even though a user adjusts the distance by artificial manipulation, there is a limit of the predetermined value (brightness adjusting value). Therefore, since it is more difficult to accurately reflect environmental elements of the surroundings which are varied depending upon the surrounding brightness (illumination intensity) and the distance between the subject and the illumination device, there is a problem in that sharper image cannot be obtained from the step of taking a picture of the subject.

SUMMARY OF THE INVENTION

Accordingly, an object of the present invention is to provide an automatic illumination control apparatus for adjusting an output of an illumination device that can automatically provide customized illumination depending upon a distance between a subject and the illumination device and illumination circumstance so that optical circumstances, such as illumination intensity and color temperature of the subject, is constantly maintained, regardless of the distance between the subject and the illumination and the illumination circumstance.

Technical Solution

To accomplish the above-mentioned object, according to one aspect of the present invention, there is provided an automatic illumination control apparatus for adjusting an output of an illumination device depending upon a distance between a subject and the illumination device, the automatic illumination control apparatus comprising: a distance measuring sensor which is installed at a position close to the illumination device to measure distance information between the illumination device and the subject; and an illumination managing unit configured to generate a management signal including an illumination intensity of illumination which is outputted from the illumination device according to the distance information, and send the management signal to the illumination device.

According to the present invention, even though the subject comes toward or away from the main illumination device and thus the illumination intensity indicative of the subject and the space around the subject is changed, it is possible to automatically adjust the brightness of the light emitted from the main illumination device, thereby representing the constant illumination intensity, regardless of the distance between the subject and the main illumination device.

Also, even though the subject comes toward or away from the main illumination device and thus the distance between the subject and the illumination is changed, the illumination intensity indicative of the subject and the space around the subject and the color temperature can be constantly maintained, thereby obtaining the still picture or the motion picture with constant quality or atmosphere.

In addition, even though in case where the illumination intensity around the space in which the subject is positioned, and variation in amounts of sunshine is caused by the movement of the subject, it is possible to automatically adjust the color temperature of the illumination emitted from the main illumination device, thereby representing the constant color temperature, regardless of the change of the surrounding illumination intensity.

DETAILED DESCRIPTION OF THE INVENTION

Hereinafter, an automatic illumination control apparatus for adjusting an output of an illumination device depending upon a distance between the illumination device and a subject according to preferred embodiments of the present invention will be hereafter described with reference to the accompanying drawings.

Figure 1:
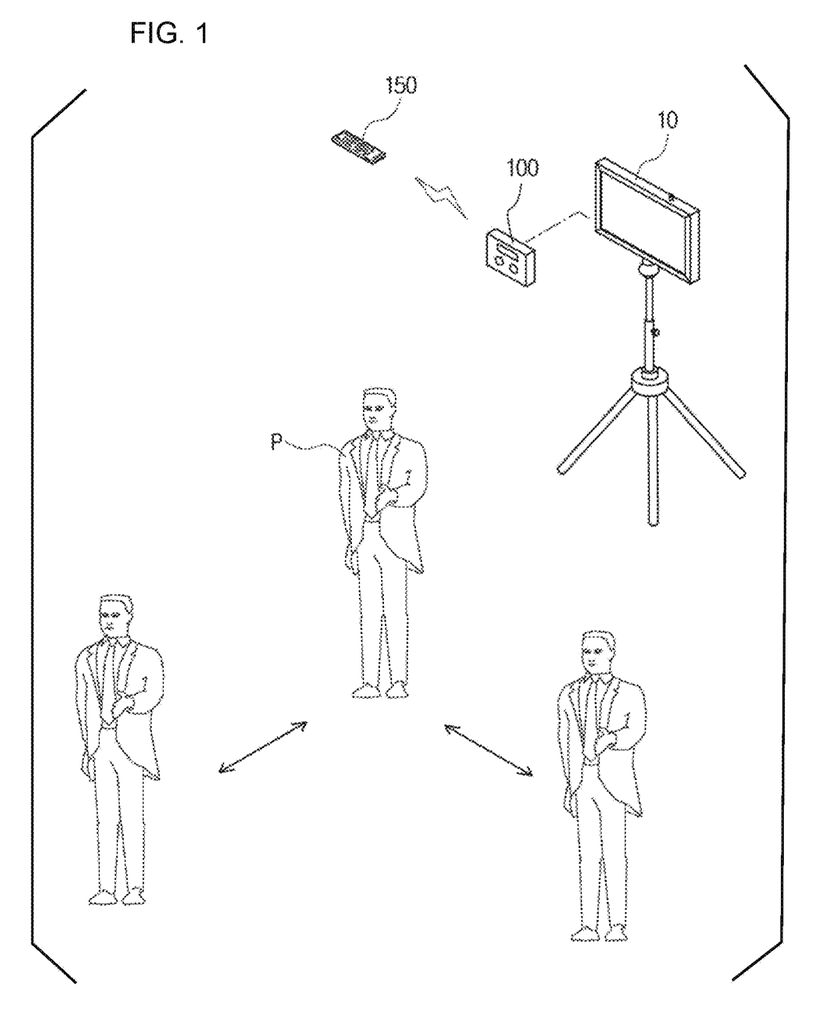
FIG. 1 is a view schematically illustrating an automatic illumination control apparatus according to one embodiment of the present invention.
Figure 2:
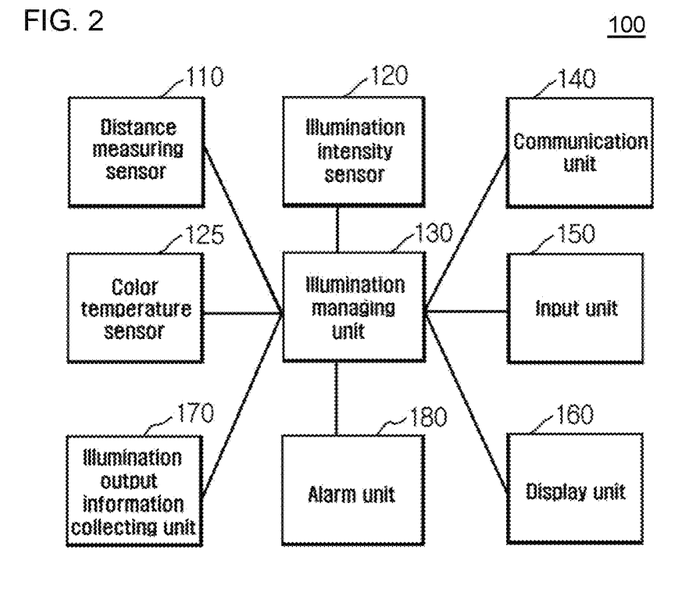
FIG. 2 is a block diagram illustrating the automatic illumination control apparatus according to one embodiment of the present invention.

FIG. 1 is a view schematically illustrating the automatic illumination control apparatus according to one embodiment of the present invention. FIG. 2 is a block diagram illustrating the automatic illumination control apparatus according to one embodiment of the present invention.

Referring to FIGS. 1 and 2, an automatic illumination control apparatus 100 according to one embodiment of the present invention includes a distance measuring sensor 110 for measuring a distance between an illumination device 10 and a subject, and an illumination managing unit 130 for generating a management signal including an illumination intensity of the illumination which is outputted from the illumination device according to the distance between the latter and the subject to display a constant illumination intensity on the subject. Alternatively, the automatic illumination control apparatus 100 may include an illumination intensity sensor 120 for reading illumination intensity information of the subject, and a color temperature sensor 125 for reading color temperature information of the subject.

The automatic illumination control apparatus 100 may be installed integrally with the illumination device 10, or may be housed in a housing which is separated from the illumination device 10 to be connected to a printed circuit board of the illumination device 10 by wire or wireless. If the automatic illumination control apparatus 100 includes a housing which is separated from the illumination device 10, the housing may be provided with a detachable member for attaching or detaching the housing to or from the illumination device 10. The detachable member may include any detachable mechanism if it is commonly used in the art, for example, Velcro.

The illumination device 10 which is integrally formed with the automatic illumination control apparatus 100 according to the present invention or is connected to the automatic illumination control apparatus 100 by wire or wireless is configured to adjust the illumination intensity of the illumination to be outputted.

If necessary, the illumination device 10 may be configured to adjust the illumination intensity and the color temperature of the illumination to be outputted. Specifically, the illumination device 10 includes a plurality of light sources each having different color temperature to output various color temperatures. For example, the illumination device 10 includes a plurality of LED modules to adjust the color temperature. In this instance, the plurality of LED modules may consist of single LED, such as a red LED, a green LED, and a blue LED, or may consist of RGB LEDs.

The illumination device 10, in which the automatic illumination control apparatus 100 of the present invention is installed, may include an LED illumination device, a camera flash, a halogen illumination device, and a fluorescent illumination device.

Specifically, the LED illumination device includes an LED panel light, a spot light, a surface illumination, and flexible light. Also, the LED illumination device preferably employs an illumination device capable of controlling a light color of 3000K to 6000K to meet various light colors.

More specifically, the illumination device 10 may include a plurality of LED modules generally arranged in a circle, of which first LEDs having a color temperature of 6000K which are usually used are arranged at a center of a printed circuit board at regular intervals, and second LEDs having a color temperature of 3000K are arranged around the first LEDs in a circle.

If the light color is controlled in this arranged state, the color temperature of 4500K which is an intermediate level can be obtained by simultaneously adjusting the first and second LEDs are regulated at the same brightness. If the current of the first LED is controlled in this state to decrease the brightness, the color temperature is gradually changed to be close to 3000K. If the first LED is completely turned off, the color temperature of 3000K can be obtained.

In contrast, if the brightness is decreased by controlling the current of the second LED in the state in which the first and second LEDs are regulated at the same brightness to obtain the color temperature of 4500K, the color temperature is gradually changed to be close to 6000K. If the second LED is completely turned off, the color temperature of 6000K can be obtained.

If the whole range is divided by a constant section and data for each divided unit is inputted to an MCU circuit of the main illumination device 10, the main illumination device 10 outputs illumination having a specific color temperature according to a management signal transmitted from the automatic illumination control apparatus 100.

Meanwhile, the illumination device 10 may be provided with a separate auxiliary device to soften or change the light emitted from the illumination device.

Now, each constitutional element will be described in detail with reference to the accompanying drawings.

Referring to FIG. 2, the automatic illumination control apparatus 100 according to the present invention includes the distance measuring sensor 110.

The distance measuring sensor 110 is installed at a position close to the main illumination device 10 to measure the distance between the main illumination device 10 and the subject P.

Figure 3:
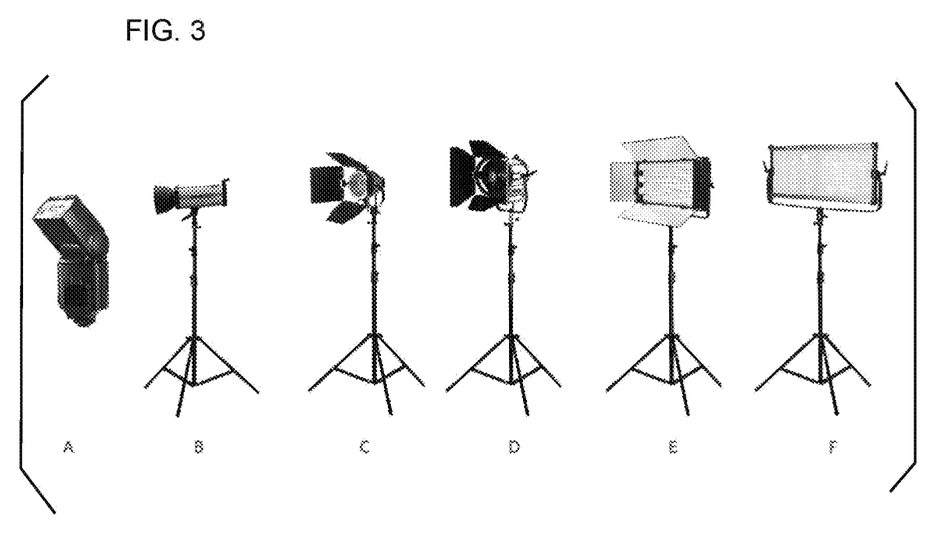
FIG. 3 is a view of an illumination equipment to illustrate a distance measuring method by a kind of illumination.

FIG. 3 is a view of an illumination equipment to illustrate a distance measuring method by a kind of illumination. The illuminations shown in FIG. 3 are to directly irradiate the light to the subject. In this instance, the distance can be measured by irradiating infrared rays, laser, waves (radar type) or the like to the subject in the same direction as the irradiation direction of the illumination.

Specifically, the distance measuring sensor 110 irradiates a distance measuring signal (infrared rays or laser) to the subject P, and receives a return signal reflected from the subject P. The distance measuring sensor 110 calculates a time difference between the transmission signal and the return signal to calculate a distance value between the illumination device 10 and the subject P and to send the distance value to the illumination managing unit 130. To this end, the distance measuring sensor 110 is electrically connected to the illumination managing unit 130.

Figure 4:
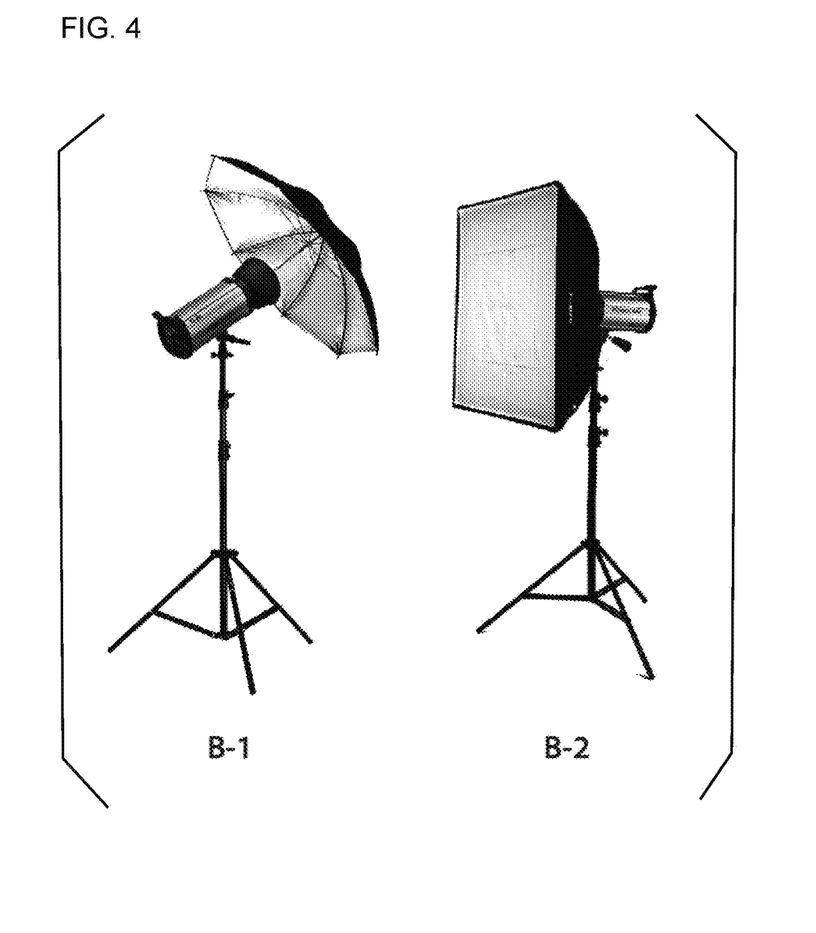
FIG. 4 is a view of another example of the illumination equipment to illustrate a distance measuring method by a kind of illumination.

FIG. 4 is a view of another example of the illumination equipment to illustrate a distance measuring method by a kind of illumination. The illuminations shown in FIG. 4 do not directly irradiate the light to the subject, but utilize an auxiliary mechanism, such as a reflector or a soft box, to soften or modify the light.

In this instance, since the subject is not positioned in the irradiated direction of the light, the subject is preferably attached by a small receiver and a small transmitter to measure the distance, in which the distance between the subject and the illumination is measured in a wireless communication by generating a radio wave (e.g., frequency of 2.4 GHz or 5 GHz).

In order to realize the illumination intensity which is similar to the level of the direct irradiation method shown in FIG. 3, the method shown in FIG. 4 should irradiate the light of higher output. In this instance, a selection mode may be introduced to additionally manage the brightness of the light source.

Referring to FIG. 2, the automatic illumination control apparatus 100 according to the present invention may further include the illumination intensity sensor 120.

The illumination intensity sensor 120 is installed at a position close to the main illumination device 10 to detect the illumination intensity of the subject P at the location of the main illumination device 10.

The illumination intensity sensor 120 reads the illumination intensity information of the subject P after the illumination intensity of the illumination device is primarily adjusted by the illumination managing unit 130 depending upon the distance between the main illumination device 10 and the subject P.

More specifically, the illumination intensity sensor 120 analyzes the illumination, which is reflected from the subject P, received by the receiver of the automatic illumination control apparatus 100 to read the field illumination intensity of the subject P, and generates the illumination intensity information containing the field illumination intensity to send the information to the illumination managing unit 130. To this end, the illumination intensity sensor 120 is electrically connected to the illumination managing unit 130.

For example, the illumination intensity sensor 120 may be installed to the main illumination device 10 to detect and output the illumination intensity of the subject P positioned in front of the main illumination device 10, and may include a digital illumination intensity sensor of I2C serial interface mode.

The illumination received by the receiver contains the illumination emitted from the illumination device 10 installed around the subject P, and contains the illumination emitted from the main illumination device 10 after the main illumination device 10 is turned on.

Referring to FIG. 2, the automatic illumination control apparatus 100 according to the present invention may further include the color temperature sensor 125.

The color temperature sensor 125 is installed at a position close to the main illumination device 10 to detect the color temperature of the subject P at the position of the main illumination device 10, and reads the color temperature information of the subject P which is to be photographed.

More specifically, the color temperature sensor 125 analyzes the illumination, which is reflected from the subject P, received by the receiver of the automatic illumination control apparatus 100 to read the field color temperature of the subject P, and generates the color temperature information containing the field color temperature to send the information to the illumination managing unit 130. To this end, the color temperature sensor 125 is electrically connected to the illumination managing unit 130.

Referring to FIG. 2, the automatic illumination control apparatus 100 according to the present invention may further include a communication unit 140.

The communication unit 140 is configured to send the management signal generated by the illumination managing unit 130 to the main illumination device 10 which is connected to the automatic illumination control apparatus 100 by wire or wireless. If the automatic illumination control apparatus 100 is provided in the main illumination device 10 in an externally housed type, the communication unit 140 is installed in the automatic illumination control apparatus 100. To this end, the communication unit 140 is electrically connected to the illumination managing unit 130, and is connected to the illumination device 10 by at least one wireless communication protocol containing Wi-Fi, WiBro (wireless broadband Internet), wireless LAN, home RF, WiMAX (worldwide interoperability for microwave access), ZigBee, Bluetooth, UWB (ultrawideband), IrDA (infrared data association), and SWAP (shared wireless access protocol).

If the automatic illumination control apparatus 100 is provided in the main illumination device 10 in the externally housed type, the automatic illumination control apparatus 100 is connected to the main illumination device 10 via an USB cable, and the management signal transmitted from the automatic illumination control apparatus 100 is sent to the printed circuit board of the main illumination device 10 via the USB cable.

Referring to FIG. 2, the automatic illumination control apparatus 100 according to the present invention may further include an input unit 150.

The input unit 150 is connected to the illumination managing unit 130 to input a reference illumination intensity so that the illumination managing unit 130 is set by the reference illumination intensity. Any input means can be used if it achieves the above object. For example, the input unit 150 may include a keypad which is attached to the automatic illumination control apparatus 100 and connected to the illumination managing unit 130 by wire, and a radio remote controller which is connected to the illumination managing unit 130 by wireless.

If necessary, the input unit 150 is configured to receive a reference color temperature so that the illumination managing unit 130 is set by the reference color temperature.

More specifically, the keypad is provided with two pairs of up and down buttons at both sides, so that the first button is to raise the illumination intensity value if the first button is pushed by an external force, the second button is to decrease the illumination intensity value if the second button is pushed by an external force, the third button is to raise the color temperature value if the third button is pushed by an external force, and the fourth button is to decrease the color temperature value if the fourth button is pushed by an external force.

The keypad may be provided with a set button so that the reference illumination value and the reference color temperature value which are automatically determined in advance according to button touch sequence are set. The set button is configured in such a way that a user can easily set the reference illumination value and the reference color temperature value which are differently set according to each capturing mode, such as an outdoor still picture capturing mode, an indoor still picture capturing mode, an indoor motion picture capturing mode, and an outdoor motion picture capturing mode.

For example, the set button may be configured so that if it is touched once, the reference illumination value and the reference color temperature value are designated by 300 lux and 3000K, if it is touched two times, the reference illumination value and the reference color temperature value are designated by 400 lux and 4000K, and if it is touched three times, the reference illumination value and the reference color temperature value are designated by 500 lux and 5000K.

If necessary, the keypad may be provided with a power button to selectively supply a power to the automatic illumination control apparatus 100.

If the automatic illumination control apparatus 100 is formed integrally with the main illumination device 10, the keypad is installed to the surface of a housing provided to the main illumination device 10. Meanwhile, if the automatic illumination control apparatus 100 is formed separately from the main illumination device 10, the keypad is installed to the surface of a housing provided to the automatic illumination control apparatus 100.

Also, the keypad may be provided with a physical button or a touch screen. In this instance, the touch screen displays an illumination intensity adjusting graph and a color temperature adjusting graph on a screen, and the user adjusts the adjusting graphs by touch to send the reference illumination value and the reference color temperature value to the illumination managing unit 130. If necessary, the touch screen is provided with icons to store the reference illumination value and the reference color temperature value which are predetermined, and if the icon is touched the predetermined value is stored.

Referring to FIG. 2, the automatic illumination control apparatus 100 according to the present invention may further include a display unit 160.

The display unit 160 is connected to the illumination managing unit 130 to output at least one of the distance information, the illumination intensity information, the color temperature information which are collected by the illumination managing unit 130, and may be installed to the outer surface of a case provided to the automatic illumination control apparatus.

Referring to FIG. 2, the automatic illumination control apparatus 100 according to the present invention may further include an illumination output information collecting unit 170.

The illumination output information collecting unit 170 is configured to collect an output range of the illumination intensity which can be outputted to the illumination device 10 formed integrally with the automatic illumination control apparatus or connected thereto by the communication unit 140. Also, the illumination output information collecting unit 170 can collect an output range of the color temperature which can be outputted to the illumination device 10.

The illumination output information collecting unit 170 collects an output range of the main illumination device 10 which can be changed by the management signal generated depending upon a variation in distance between the subject P and the main illumination device 10.

According to one embodiment, if the illumination output information collecting unit 170 of the present invention is connected to the main illumination device 10 via the communication unit 140, the illumination output information collecting unit 170 searches the output ranges of the illumination intensity and color temperature set in the memory of the main illumination device 10 according to an installed program, and extracts and sends it to the illumination managing unit 130.

According to another embodiment, if the illumination output information collecting unit 170 is inputted by the output ranges of the illumination intensity and color temperature of the main illumination device 10 via the input unit 150, such as the touch screen, the illumination output information collecting unit 170 transmits it to the illumination managing unit 130.

Referring to FIG. 2, the automatic illumination control apparatus 100 according to the present invention may further include an alarm unit 180.

The alarm unit 180 is configured to generate an alarm so that if the illumination intensity and the color temperature of the illumination contained in the management signal get out of the output range of the main illumination device 10, the user can figure out the deviation. To this end, the alarm unit 180 may include a loudspeaker for outputting a sound, or an LED module for outputting a flickering signal.

The automatic illumination control apparatus according to the present invention may further include a storage unit (not illustrated).

The storage unit is stored with a distance/illumination intensity gain table which optimizes a brightness step of the main illumination device 10 depending upon the illumination value measured by the illumination intensity sensor 120 and the distance between the subject P and the illumination device.

Also, the storage unit receives the color temperature value and the illumination intensity from the user through the input unit 150, and stores the values as the reference illumination and the reference color temperature.

Referring to FIG. 2, the automatic illumination control apparatus 100 according to the present invention includes the illumination managing unit 130.

The illumination managing unit 130 generates the management signal containing the illumination intensity of the illumination to be outputted from the illumination device 10, according to the distance information collected by the distance measuring sensor 110, and sends the generated management signal to the main illumination device 10.

Also, the illumination managing unit 130 generates the management signal containing the illumination intensity value of the illumination to be outputted from the main illumination device 10, according to the illumination intensity information provided from the illumination intensity sensor 120, so as to measure the reference illumination intensity by the illumination intensity sensor 120, and sends the management signal to the main illumination device 10.

In addition, the illumination managing unit 130 generates the management signal containing the color temperature value of the illumination to be outputted from the main illumination device 10, according to the color temperature information provided from the color temperature sensor 125, so as to measure the reference color temperature by the color temperature sensor 125, and sends the management signal to the main illumination device 10.

To this end, the illumination managing unit 130 is connected to the distance measuring sensor 110, the illumination intensity sensor 120, the color temperature sensor 125, the communication unit 140, the input unit 150, the display unit 160, the illumination output information collecting unit 170, the alarm unit 180, the distance measuring sensor 110 and the storage unit.

The illumination managing unit 130 compares the distance value measured by the distance measuring sensor 110 and the illumination intensity value by distance which is stored in the storage unit, and determines the illumination intensity (brightness) of the main illumination device 10. In this instance, the illumination intensity is proportional to the brightness of the light source, while is inverse proportional to the square of the distance.

For example, the illumination intensity, the brightness of the light source, and the distance between the light source and the subject are defined by Equation 1 below:

$$\text{Illumination intensity} = \text{Brightness of light source (cd)} / \text{Square of distance}(m^2)[lx] \qquad \text{Equation 1}$$

Meanwhile, if the automatic illumination control apparatus 100 is formed integrally with the main illumination device 10, the illumination managing unit 130 is connected to the printed circuit board of the main illumination device 10. If the automatic illumination control apparatus 100 is detachably provided to the main illumination device 10, the illumination managing unit 130 is connected to the main illumination device 10 via the communication unit 140 by wire or wireless.

The illumination managing unit 130 applies the illumination intensity value collected by the illumination intensity sensor 120 and the distance values collected by the distance measuring sensor 110 to the distance/illumination intensity table stored in the storage unit, and derives the optimum illumination intensity (brightness) value of the main illumination device 10 to match the illumination intensity with the reference illumination intensity. More specifically, if the illumination intensity of the subject P and the illumination intensity around the subject P are detected by the illumination intensity sensor 120, the illumination managing unit 130 compares the illumination intensity value detected by the illumination intensity sensor 120 and the distance value calculated by the distance measuring sensor 110 with the distance/illumination intensity gain table stored in the storage to determine the brightness of the main illumination device 10. In this instance, the main illumination device 10 emits the light in the corresponding brightness according to the management signal of the illumination managing unit

130. In addition, the illumination managing unit 130 can control the display unit 160 to display the distance value between the subject P and the illumination device and the illumination intensity value and the color temperature value of the illumination emitted from the illumination device 10 on the display unit 160.

If the illumination managing unit 130 is inputted by the illumination intensity and the color temperature through the input unit 150, the illumination managing unit 130 sets the illumination intensity and the color temperature as the reference illumination value and the reference color temperature value, and then stores the values in the memory or storage unit.

For example, if the reference color temperature is 4000K, the reference illumination intensity value is 800 lux, and the illumination intensity and the color temperature of the subject P measured by the color temperature sensor 125 and the illumination intensity sensor 120 are 3500K and 500 lux, the illumination managing unit 130 gradually increases the illumination intensity value and the color temperature value of the light source to be outputted from the main illumination device 10, until the illumination intensity and the color temperature measured by the color temperature sensor 125 and the illumination intensity sensor 120 are 4000K and 800 lux.

As described above, if the illumination device 10 is provided with the auxiliary mechanism, such as the soft box and the reflector, it is possible to select the selection mode by the input unit 150. When the selection mode is selected, the illumination managing unit 130 can separately manage the brightness of the light source, different from the auxiliary mechanism. For example, if the selection mode is selected by the input unit 150, the illumination managing unit 130 applies the illumination intensity value collected by the illumination intensity sensor 120 and the distance values collected by the distance measuring sensor 110 to the distance/illumination intensity table stored in the storage unit, and derives the optimum illumination intensity (brightness) value of the main illumination device 10 to match the illumination intensity with the reference illumination intensity.

More specifically, the illumination managing unit 130 compares the illumination intensity value detected by the illumination intensity sensor 120 and the distance value calculated by the distance measuring sensor 110 with the distance/illumination intensity gain table stored in the storage to determine the brightness of the main illumination device 10. If the selection mode is selected by the input unit 150, the illumination intensity value detected by the illumination intensity sensor 120 and the distance value calculated by the distance measuring sensor 110 are compared with the distance/illumination intensity gain table stored in the storage to determine the brightness of the main illumination device 10.

Even though the illumination device with the auxiliary mechanism, such as the reflector, and the illumination device with no the auxiliary mechanism emit the light toward the subject at the same distance, it is because the light emitted from the illumination device with the auxiliary mechanism is brighter.

Accordingly, the light emitted from the main illumination device 10 is irradiated towards the subject P under the more accurate and fine control of the illumination managing unit 130, and thus the image of the subject P to be photographed by a photography device, such as a camera, is maintained at the wanted brightness by the irradiation of the light, thereby obtaining the image of the subject P to which the illumination of the uniform brightness is applied.

If the illumination intensity information is collected by the illumination intensity sensor 120 and the color temperature information is collected by the color temperature sensor 125, the illumination managing unit 130 outputs the illumination intensity information and the color temperature information through the display unit 160 to allow the user to verify it.

If the subject P moves by a distance not to represent the reference illumination intensity and the reference color temperature through the illumination intensity and the color temperature of the illumination emitted from the main illumination device 10, the illumination managing unit 130 outputs the alarm through the alarm unit 180 so that the user can verify it. In other words, if the management signal including the illumination intensity and the color temperature of the illumination which are deviated from the output range of the main illumination device 10 are generated, the illumination managing unit 130 stops the emission of the illumination from the main illumination device 10, and outputs the alarm through the alarm unit 180.

The illumination managing unit 130 stops the output of the alarm if a signal for changing the reference illumination and the reference color temperature is inputted through the input unit 150, such as a radio remote controller, while the alarm is outputted from the alarm unit 180.

If necessary, if the alarm is outputted from the alarm unit 180 during a predetermined time, preferably 5 to 30 seconds, the illumination managing unit 130 generates the management signal having a limit value of the output range for the illumination intensity and the color temperature of the illumination device 10, and sends it to the main illumination device 10.

For example, supposing that the maximum brightness of the main illumination device 10 is 3000 lux, the reference illumination intensity of the subject P is 500 lux, and the main illumination device 10 emits the light of 3000 lux toward the subject P which is away from the illumination by about 5 m, if the subject P is away from the main illumination device 10 by 5 m or more under the field illumination intensity of 500 lux, the automatic illumination control apparatus 100 outputs the alarm through the alarm unit 180. If the alarm goes by the predetermined time, 10 seconds, the illumination managing unit 130 generates the management signal having the illumination intensity value of 3000 lux, and sends it to the printed circuit board of the main illumination device 10.

As described above, in case where the subject P is positioned below a fluorescent light and the subject p is positioned below an incandescent light, the color temperature of the subject P is different from each other. If the automatic illumination control apparatus 100 according to the present invention is set by the reference color temperature of 4000K, the automatic illumination control apparatus 100 can control the main illumination device 10 even though the color temperature of the subject P is changed when the illumination device 10 installed under peripheral circumstance of the subject P is changed from the incandescent light to the fluorescent light, or the subject P is moved from the incandescent light to the fluorescent light, so that the main illumination device 10 emits the illumination of the color temperature to be compensated, thereby representing the wanted color temperature of 4000K.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. An automatic illumination control apparatus for adjusting an output of an illumination device depending upon a distance between a subject and the illumination device, the automatic illumination control apparatus comprising:

a distance measuring sensor which is installed at a position close to the illumination device to measure distance information between the illumination device and the subject;

an illumination managing unit configured to generate a management signal including an illumination intensity of illumination which is outputted from the illumination device according to the distance information, and send the management signal to the illumination device;

an illumination intensity sensor which is installed at a position close to the main illumination device to read illumination intensity information of the subject and send the illumination intensity information to the illumination managing unit, wherein the illumination managing unit generates a management signal including the illumination intensity of the illumination to be outputted from the illumination device according to the illumination intensity information so that a reference illumination intensity is detected by the illumination intensity sensor, and sends the management signal to the illumination device;

a color temperature sensor which is installed at a position close to the main illumination device to read color temperature information of the subject, wherein the illumination managing unit generates a management signal including the color temperature of the illumination to be outputted from the illumination device according to the color temperature information so that a reference color temperature is detected by the color temperature sensor, and sends the management signal to the illumination device;

an illumination output information collecting unit configured to collect output ranges of the illumination intensity and color temperature which can be outputted to the illumination device; and an alarm unit configured to generate an alarm so that if the illumination intensity and the color temperature of the illumination contained in the management signal get out of the output range of the main illumination device.

2. The automatic illumination control apparatus according to claim 1, further comprising a communication unit configured to send the management signal to the illumination device which is connected to the automatic illumination control apparatus by wire or wireless.

3. The automatic illumination control apparatus according to claim 1, further comprising an input unit configured to input the reference illumination intensity and the reference color temperature so that the illumination managing unit is set by the reference illumination intensity and the reference color temperature.

4. The automatic illumination control apparatus according to claim 1, further comprising a display unit configured which is connected to the illumination managing unit to output the illumination intensity information and the color temperature information which are collected by the illumination managing unit.

5. The automatic illumination control apparatus according to claim 1, wherein if the alarm unit generates the alarm during a predetermined time, the illumination managing unit generates a management signal having limit values of the output ranges of the illumination intensity and the color temperature of the illumination device, and sends the management signal to the illumination device.

* * * * *